US008296044B2

(12) United States Patent
Hoffmann et al.

(10) Patent No.: US 8,296,044 B2
(45) Date of Patent: Oct. 23, 2012

(54) METHOD FOR THE LOCALIZATION OF A FAULT LOCATION WITHIN A FUEL INJECTION SYSTEM

(75) Inventors: Robert Hoffmann, Ruhstorf/Rott (DE); Hartmut Wolpert, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 823 days.

(21) Appl. No.: 12/515,577

(22) PCT Filed: Nov. 20, 2007

(86) PCT No.: PCT/EP2007/062596

§ 371 (c)(1),
(2), (4) Date: May 20, 2009

(87) PCT Pub. No.: WO2008/061994

PCT Pub. Date: May 29, 2008

(65) Prior Publication Data

US 2010/0024777 A1 Feb. 4, 2010

(30) Foreign Application Priority Data

Nov. 23, 2006 (DE) ........................ 10 2006 055 341

(51) Int. Cl.

| | |
|---|---|
| ***G06F 19/00*** | (2011.01) |
| ***F02D 41/22*** | (2006.01) |
| ***F02D 41/20*** | (2006.01) |
| ***F02D 41/38*** | (2006.01) |
| ***G01M 15/00*** | (2006.01) |

(52) U.S. Cl. ..... 701/114; 123/479; 123/490; 73/114.45; 702/185

(58) Field of Classification Search .................. 123/446, 123/479, 490; 701/101–105, 114, 115, 182, 701/183, 185; 73/114.38, 114.45, 114.47–114.49
See application file for complete search history.

(56) References Cited

U.S. PATENT DOCUMENTS

| | | | | |
|---|---|---|---|---|
| 5,469,825 | A * | 11/1995 | Golab et al. | 123/479 |
| 5,711,273 | A * | 1/1998 | Barnes et al. | 123/198 D |
| 5,964,811 | A * | 10/1999 | Ishii et al. | 701/114 |
| 6,366,868 | B2 | 4/2002 | Freudenberg et al. | |
| 6,456,928 | B1 * | 9/2002 | Johnson | 701/114 |
| 6,472,796 | B1 | 10/2002 | Hoffmann et al. | |
| 6,880,530 | B2 * | 4/2005 | Oyama et al. | 123/479 |
| 7,467,543 | B2 | 12/2008 | Schoor et al. | |
| 7,822,537 | B2 * | 10/2010 | Perryman et al. | 701/114 |

(Continued)

FOREIGN PATENT DOCUMENTS

DE 19845042 A1 4/2000

(Continued)

OTHER PUBLICATIONS

German Office Action, German application No. 10 2006 055 341 1-26, 4 pages, Aug. 9, 2007.

(Continued)

*Primary Examiner* — Willis R Wolfe, Jr.
(74) *Attorney, Agent, or Firm* — King & Spalding L.L.P.

(57) ABSTRACT

In a method for localizing a fault location within a fuel injection system, when a critical fault is detected by the diagnostic function, a pulse or a series of pulses to the injectors is triggered by a control unit. By observing the voltage value and/or charge value at the injector, it is possible to localize the fault location within the fuel injection system.

10 Claims, 1 Drawing Sheet

U.S. PATENT DOCUMENTS

| | | | |
|---|---|---|---|
| 2001/0039484 | A1 | 11/2001 | Freudenberg et al. |
| 2006/0067024 | A1 | 3/2006 | Chemisky et al. |
| 2007/0001545 | A1 | 1/2007 | Schoor et al. |
| 2008/0278876 | A1 | 11/2008 | Kudicke et al. |

FOREIGN PATENT DOCUMENTS

| | | | | |
|---|---|---|---|---|
| DE | 19845042 | C2 | 8/2000 | |
| DE | 10256456 | A1 | 7/2004 | |
| DE | 10336639 | A1 | 3/2005 | |
| DE | 102004021377 | A1 | 11/2005 | |
| EP | 1420156 | A2 | 5/2004 | |
| EP | 1217667 | B1 | 6/2006 | |
| JP | 04311677 | A * | 11/1992 | .................... 701/114 |
| WO | WO 9967527 | A2 | 12/1999 | |
| WO | WO 2005045234 | A1 | 5/2005 | |

OTHER PUBLICATIONS

International Search Report, PCT/EP2007/052596, 12 pages, Mar. 11, 2008.

* cited by examiner

METHOD FOR THE LOCALIZATION OF A FAULT LOCATION WITHIN A FUEL INJECTION SYSTEM

CROSS-REFERENCE TO RELATED APPLICATIONS

This application is a United States national phase filing under 35 U.S.C. §371 of International Application No. PCT/EP2007/062596, filed Nov. 20, 2007 which claims priority to German Patent Application No. 10 2006 055 341.1, filed Nov. 23, 2006. The complete disclosure of the above-identified application is hereby fully incorporated herein by reference.

TECHNICAL FIELD

The invention relates to a method for the localization of a fault location within a fuel injection system.

BACKGROUND

Fuel injection devices for the operation of an internal combustion engine have been widely known for many years. In the case of a so-called common-rail injection system, the feeding of fuel into the respective combustion chamber of the internal combustion engine takes place by means of injectors, in particular by means of piezo injectors. As a rule, injectors are controlled here from within a control unit via an electrical circuit (final stage), and regulated by a software program. The electrical circuit arrangement and the microprocessor on which the software runs, are here as a rule components of the control unit, in particular of an engine control unit. Faults can arise during operation of the internal combustion engine, such as for example a short circuit of a connecting line of an injector to electrical ground or the battery, which call for the fastest possible separation of the electrical circuit arrangement from the injectors, in order to protect these against thermal destruction.

According to the prior art, methods are known, in which by means of additional components on the control unit it is attempted to determine the fault location within the fuel injection system with the maximum possible precision.

SUMMARY

According to various embodiments, a method can be provided which enables a simple and secure detection of the fault location without additional components for the control unit.

According to an embodiment, a method for the localization of a fault location within a fuel injection system comprising a control unit, which actuates injectors, in particular piezo injectors, a diagnostic unit for the detection of a defect within the fuel injection system, a measuring unit for determining voltage levels and/or charge levels and with a separation unit for separation of the control unit from the injectors, may be characterized in that after a defect detected within the fuel injection system by the diagnostic unit, at least one pulse of defined energy content and duration is transmitted to each injector by means of the control unit, in that a defective injector is identified by the measuring unit determining a voltage value and/or charge value at the injector which is outside a prescribed range, and in that a defect affecting connection components and/or power components is identified from the fact that a voltage value and/or charge value determined at the injector falls below a prescribed limit value.

According to a further embodiment, a fault in the control unit can be detected from the fact that this is separated from the injectors by means of the separation unit, and at least one pulse can be transmitted to a load located at the control unit, and if no voltage value and/or charge value can be determined at the load, a fault is identified. According to a further embodiment, the energy content and the duration of the pulse may be selected such that components in the control unit are not destroyed by the pulse, and/or the separation unit is not activated and/or neither does injection take place.

BRIEF DESCRIPTION OF THE DRAWINGS

Details of the invention are explained in greater detail with reference to the drawings, wherein.

DETAILED DESCRIPTION

The advantages achieved with the various embodiments consist in particular in that a method for localization of a fault location within an injection system is provided. This is in particular advantageous since by means of a precise identification of the fault location, the smallest replaceable unit is detected in the event of a fault, and workshop costs can thus be saved. Furthermore, vehicle availability is improved through identification of the fault location. Upon identification of an electrical fault by a diagnostic unit, the internal combustion engine is regulated to ensure it is in safe operating mode by means of suitable measures. An attempt is further made to identify whether just one injector or a bank of injectors is defective. Should identification of the defective injector not be possible here, the entire internal combustion engine must be switched off.

Figure 1:
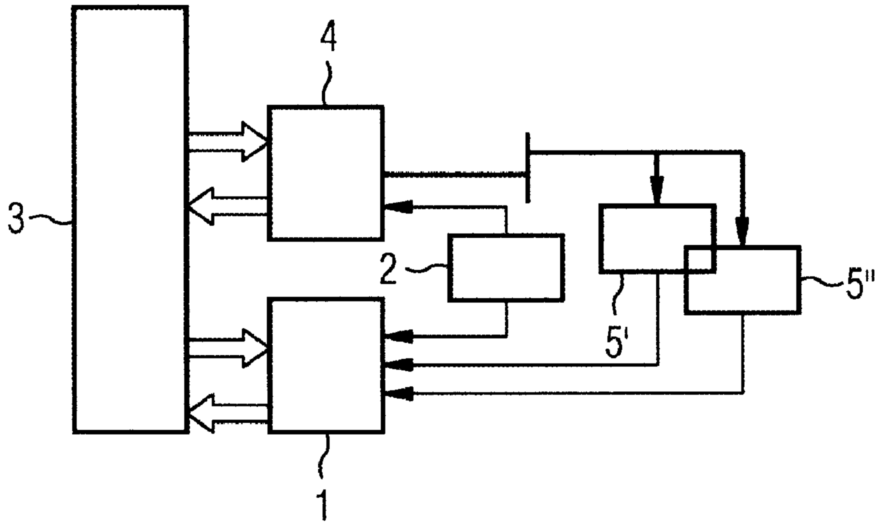
FIG. 1 shows a circuit diagram for localization of the fault location within a fuel injection system.

FIG. 1 shows a circuit diagram for localization of the fault location within a fuel injection system.

FIG. 1 shows a control unit 3, which is connected to a shared connecting line of the injectors 5' or 5", with a decoupling unit or separation unit 4 being connected between the two. The selection of the injectors 5' and 5" takes place here via a selection circuit arrangement 1, through which in each case one injector return line leads back to the control unit 3. A protection device 2 is further provided, which is connected on the input side to a shared connecting line and on the output side both to the separation unit 4 and the selection unit 1.

A critical fault within the fuel injection system is identified by means of a diagnostic function in the control unit 3. It has proved particularly advantageous here to employ a software diagnostic function. Identification of the critical fault can for example take place in that a multiply recurrent activation of the protection device 2 is detected by the control unit 3. Based on the identification of the critical fault, separation of the control unit 3 from the injectors 5' and 5" takes place. The protection device 2 triggers a signal both to the electrical circuit of the separation unit 4 and to the selection unit 1, which effects a separation of the control unit 3 from the injectors 5' and 5" such that the circuit arrangement of the electrical circuit in the separation unit 4 is interrupted. However as a result of rapid separation of the control unit 3 from the injectors 5' and 5" by means of the separation unit 4, voltage peaks can occur within the fuel injection system as the coil in the circuit arrangement of the electrical circuit arrangement still carries current, which makes it almost impossible for the software to localize the fault occurring. It is thus only possible to establish that a serious fault has arisen, but not which fault symptom is present, e.g. short circuit to ground or battery or on the shared injector connecting line or on the selection line.

The control unit 3 then in each case transmits a pulse and/or a series of pulses to the particular injector 5' or 5" to be observed. The energy level and duration of this pulse must be selected such that the possibility of destruction of components in the control unit 3 is excluded, and/or no injection is effected by the injectors 5' and 5", and/or the separation unit 4 is not activated. As a result of the non-activation of the separation unit 4 it is ensured that the voltage and/or charge values measured at the injectors 5' and 5" can be used for fault location. Activation of the separation unit 4 takes place in the case of excessively high energy content of the pulse and/or an excessively high current gradient upon energization of the injector as a result of the pulse. The voltage values and/or charge values at the injectors 5' and 5" selected via the selection unit 1 are determined by means of a measuring device in the control unit 3.

A fault in the plug connector and/or in the cable loom within a fuel injection system can be identified when the measuring device in the control unit 3 detects a voltage value and/or charge value at the injector 5' or 5" which lies below a prescribed limit value. A fault in the injector 5' and/or in the injector 5" can then be identified, if the voltage value and/or charge value determined lies outside a predefined range. In order to identify a fault within the control unit 3, the control unit 3 must be separated from the injectors 5' and 5" via the separation unit 4. The control unit 3 likewise triggers a pulse and/or a series of several pulses with a defined energy content and of a defined duration, and transmits this to a load provided in the control unit 3, and not shown in the drawing. A fault within the control unit 3 is then identified if the measuring unit of the control unit 3 determines no voltage value and/or charge value on the load.

Figure 2:
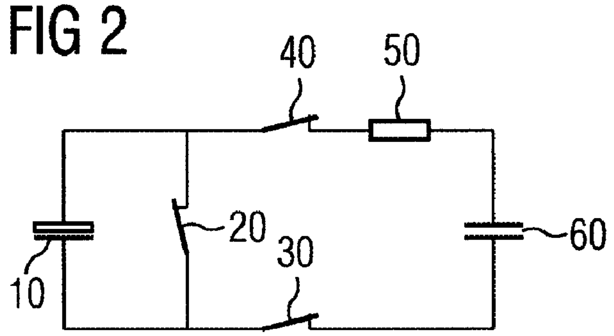
FIG. 2 shows an electric circuit for localization of the fault location within a fuel injection system.

FIG. 2 shows an electric circuit for localization of the fault location within a fuel injection system. A voltage source 10 here supplies an injector 60 with energy via a coil 50. An injector 60 can be actuated via a switch 30 assigned to the selection unit. The separation unit is here embodied as an electrical switch 40 and serves to effect separation of the control unit from the injector 60. With the aid of the switch 20 arranged in parallel with the voltage source 10 it is possible to ensure that after an actuation, complete discharging of the injector 60 takes place. The switches 20, 30 and 40 of the electric circuit are harmonized with each other in such a way that no short circuit arrangement occurs in normal operation.

Upon charging of the injector 60, the separation unit 40 and the switch 30 of the selection unit are closed. Actuation of the switches 20, 30 and 40 is effected here by the control unit, which is not shown in the drawing.

Figure 3:
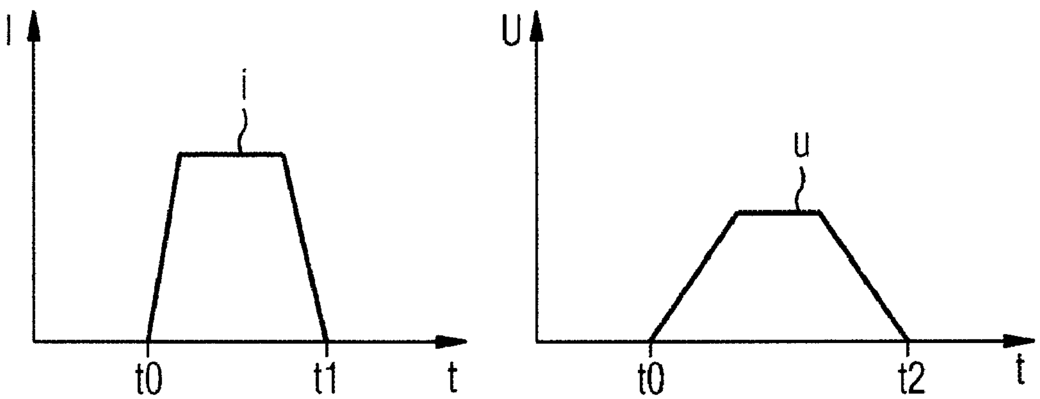
FIG. 3 shows a current and voltage profile upon the triggering of a pulse by the control unit.

FIG. 3 shows a current and voltage profile upon the triggering of a pulse by the control unit. An injector is energized with the current signal i at the point in time t0 until the point in time t1, based on the triggered pulse. A voltage profile u can be determined during the period t0 to t2, where this period can be longer than the period t0 to t1 upon energization of the injector. The level of the current signal i is selected here such that no injection by the injector takes place. The current gradient at the start of the energization is furthermore determined, as it definitively derives from the electrical properties of the injector. If this current gradient is too high, an interruption of the energization/charging process is effected by the separation unit.

The invention claimed is:

1. A method for the localization of a fault location within a fuel injection system with a control unit, which actuates injectors, a diagnostic unit for the detection of a defect within the fuel injection system, a measuring unit for determining at least one of voltage levels and charge levels and with a separation unit for separation of the control unit from the injectors, the method comprising the steps of:

after a defect detected within the fuel injection system by the diagnostic unit, transmitting at least one pulse of defined energy content and duration to each injector by means of the control unit, identifying a defective injector by the measuring unit by determining at least one of a voltage value and charge value at the injector which is outside a prescribed range, and identifying a defect affecting at least one of connection components and power components from the fact that at least one of the voltage value and the charge value determined at the injector falls below a prescribed limit value.

2. The method according to claim 1, wherein a fault in the control unit is detected from the fact that this is separated from the injectors by means of the separation unit, and at least one pulse is transmitted to a load located at the control unit, and if at least one of no voltage value and no charge value can be determined at the load, a fault is identified.

3. The method according to claim 1, wherein at least one of the energy content and the duration of the pulse are selected such that components in the control unit are not destroyed by the pulse, and the separation unit is not activated and neither does injection take place.

4. A method for the localization of a fault location within a fuel injection system with a control unit, which actuates piezo injectors, a diagnostic unit for the detection of a defect within the fuel injection system, a measuring unit for determining at least one of voltage levels and charge levels and with a separation unit for separation of the control unit from the piezo injectors, the method comprising the steps of:

after a defect detected within the fuel injection system by the diagnostic unit, transmitting at least one pulse of defined energy content and duration to each injector by means of the control unit, identifying a defective piezo injector by the measuring unit by determining at least one of a voltage value and charge value at the piezo injector which is outside a prescribed range, and identifying a defect affecting at least one of connection components and power components from the fact that at least one of the voltage value and the charge value determined at the piezo injector falls below a prescribed limit value.

5. The method according to claim 4, wherein a fault in the control unit is detected from the fact that this is separated from the injectors by means of the separation unit, and at least one pulse is transmitted to a load located at the control unit, and if at least one of no voltage value and no charge value can be determined at the load, a fault is identified.

6. The method according to claim 4, wherein at least one of the energy content and the duration of the pulse are selected such that components in the control unit are not destroyed by the pulse, and the separation unit is not activated and neither does injection take place.

7. A system for the localization of a fault location within a fuel injection system comprising a control unit, which actuates injectors, a diagnostic unit for the detection of a defect within the fuel injection system, a measuring unit for determining at least one of voltage levels and charge levels and with a separation unit for separation of the control unit from the injectors, the system being operable:

after a defect detected within the fuel injection system by the diagnostic unit, to transmit at least one pulse of defined energy content and duration to each injector by means of the control unit, to identify a defective injector by the measuring unit by determining at least one of a voltage value and charge value at the injector which is outside a prescribed range, and to identify a defect affecting at least one of connection components and power components from the fact that at least one of the voltage value and the charge value determined at the injector falls below a prescribed limit value.

8. The system according to claim 7, wherein the system is further operable to detect a fault in the control unit from the fact that this is separated from the injectors by means of the separation unit, and to transmit at least one pulse to a load located at the control unit, and if at least one of no voltage value and no charge value can be determined at the load, to identify a fault.

9. The system according to claim 7, wherein at least one of the energy content and the duration of the pulse are selected such that components in the control unit are not destroyed by the pulse, and the separation unit is not activated and neither does injection take place.

10. The system according to claim 7, wherein the injectors are a piezo injectors.

* * * * *